United States Patent
Nidd et al.

(10) Patent No.: US 12,380,342 B2
(45) Date of Patent: Aug. 5, 2025

(54) ALERT MANAGEMENT IN DATA PROCESSING SYSTEMS

(71) Applicant: International Business Machines Corporation, Armonk, NY (US)

(72) Inventors: Michael Elton Nidd, Zürich (CH); Hagen Völzer, Zürich (CH); Ioana Giurgiu, Zürich (CH); Jinho Hwang, Ossining, NY (US); Larisa Shwartz, Greenwich, CT (US)

(73) Assignee: International Business Machines Corporation, Armonk, NY (US)

( * ) Notice: Subject to any disclaimer, the term of this patent is extended or adjusted under 35 U.S.C. 154(b) by 915 days.

(21) Appl. No.: 16/986,342

(22) Filed: Aug. 6, 2020

(65) Prior Publication Data
US 2022/0044129 A1 Feb. 10, 2022

(51) Int. Cl.
*G06N 5/04* (2023.01)
*G06F 16/23* (2019.01)
(Continued)

(52) U.S. Cl.
CPC ........... *G06N 5/04* (2013.01); *G06F 16/2379* (2019.01); *G06N 5/01* (2023.01); *G06N 20/20* (2019.01)

(58) Field of Classification Search
CPC . G06N 5/04; G06N 20/20; G06N 5/01; G06F 16/2379
See application file for complete search history.

(56) References Cited

U.S. PATENT DOCUMENTS 8,103,612 B2  1/2012  Zhou
9,373,081 B2  6/2016  Lorge
(Continued)

FOREIGN PATENT DOCUMENTS

CN  101242549 A  8/2008
CN  107832200 A  3/2018
(Continued)

OTHER PUBLICATIONS

Pandey, Sanjib Raj, Ma, Jixin and Lai, Choi-Hong (2020) A supervised machine learning approach to generate the auto rule for clinical decision support system. Trends in Medicine, 20 (3). pp. 1-9. ISSN 1594-2848 (doi:https://doi.org/10.15761/TIM.1000232) (Year: 2020).*

(Continued)

*Primary Examiner* — Mohamed Abou El Seoud
*Assistant Examiner* — Matiyas T Maru
(74) *Attorney, Agent, or Firm* — Randy Tejeda (57) ABSTRACT

Several aspects are provided for dynamically updating an alert-management system that uses a master ruleset to match alerts in a data processing system with automata for handling the alerts. A method comprises training a machine learning model to correlate the alerts with the automata using a training dataset comprising alerts which were successfully handled by the automata. The machine learning model is then applied to correlate unmatched alerts with the automata, wherein the unmatched alerts were not matched to the automata by the master ruleset. The method further comprises analyzing operation of the machine learning model in relation to correlation of the unmatched alerts to define a new ruleset for matching the unmatched alerts with the automata and outputting the new ruleset for auditing of each rule in the new ruleset. In response to approval of an audited rule, the audited rule is added to the master ruleset.

18 Claims, 4 Drawing Sheets

(51) Int. Cl.
*G06N 5/01* (2023.01)
*G06N 20/00* (2019.01)
*G06N 20/20* (2019.01)

(56) References Cited

U.S. PATENT DOCUMENTS

| | | | |
|---|---|---|---|
| 9,792,169 | B2 | 10/2017 | Seigel |
| 10,361,905 | B2 | 7/2019 | Chen |
| 11,275,832 | B2* | 3/2022 | Li .................. G06F 21/554 |
| 11,496,507 | B2 | 11/2022 | Yamada |
| 2011/0208677 | A1 | 8/2011 | Zhou et al. |
| 2012/0173465 | A1* | 7/2012 | Hore .................. G06N 5/02 |
| | | | 706/12 |
| 2013/0185243 | A1 | 7/2013 | Lorge |
| 2013/0290092 | A1 | 10/2013 | Basu |
| 2015/0174766 | A1* | 6/2015 | Jägenstedt .............. B25J 13/06 |
| 2017/0031741 | A1 | 2/2017 | Seigel |
| 2017/0039553 | A1 | 2/2017 | Ghatage |
| 2017/0126523 | A1 | 5/2017 | Chen et al. |
| 2020/0097858 | A1* | 3/2020 | Baikalov .............. G06F 18/2148 |
| 2020/0396144 | A1* | 12/2020 | Clarke .................. H04L 41/16 |
| 2022/0011271 | A1 | 1/2022 | Izumi et al. |

FOREIGN PATENT DOCUMENTS

| | | |
|---|---|---|
| CN | 111222133 A | 6/2020 |
| CN | 116157779 A | 5/2023 |
| DE | 112021003403 T5 | 4/2023 |
| GB | 2612755 A | 5/2023 |
| JP | H03-122719 A | 5/1991 |
| JP | 2013-008188 A | 1/2013 |
| JP | 6647461 B1 | 2/2020 |
| JP | 2023-538244 A | 9/2023 |
| WO | 2016/170574 A1 | 10/2016 |
| WO | 2018/163342 A1 | 9/2018 |
| WO | 2020/100967 A1 | 5/2020 |
| WO | 2022/029599 A1 | 2/2022 |

OTHER PUBLICATIONS

Houtao Deng and G. Runger, "Feature selection via regularized trees," The 2012 International Joint Conference on Neural Networks (IJCNN), Brisbane, QLD, Australia, 2012, pp. 1-8, doi: 10.1109/IJCNN.2012.6252640. (Year: 2012).*

Abu Mansour, Hussein Y. Rule pruning and prediction methods for associative classification approach in data mining. Diss. University of Huddersfield, 2012. (Year: 2012).*

Mahgoub, Hany, et al. "A text mining technique using association rules extraction." International Journal of Computer and Information Engineering 2.6 (2008): 2044-2051. (Year: 2008).*

Lakshminarayanan, Balaji, Daniel M. Roy, and Yee Whye Teh. "Mondrian forests: Efficient online random forests." Advances in neural information processing systems 27 (2014). (Year: 2014).*

Košt'ál et al., "Management and monitoring of IoT devices using blockchain." (Year: 2019).*

Pandey et al., "A supervised machine learning approach to generate the auto rule for clinical decision support system" (Year: 2020).*

Mansour, et al., "Rule pruning and prediction methods for associative classification approach in data mining" (Year: 2012).*

Lakshminarayanan, et al., "Mondrian forests: Efficient online random forests." (Year: 2014).*

Harper et al., "Cookbook, A Recipe for Fault Localization", Published in NOMS 2018—2018 IEEE/IFIP Network Operations and Management Symposium, DOI:10.1109/NOMS.2018.8406284, IEEE, Taipei, Taiwan, Apr. 23, 2018, 6 Pages.

Mashayekhi et al., "Rule Extraction from Random Forest: The RF+HC Methods", Barbosa D., Milios E. (eds) Advances in Artificial Intelligence AI 2015, Lecture Notes in Computer Science, vol. 9091, Springer International Publishing, Switzerland, 2015, 15 Pages.

Phung et al., "Extracting Rule RF in Educational Data Classification: From a Random Forest to Interpretable Refined Rules", 2015 International Conference on Advanced Computing and Applications (ACOMP), pp. 20-27, doi: 10.1109/ACOMP.2015.13, Ho Chi Minh City, 2015, 8 Pages.

Rothuizen et al., "Assisting Database Management", U.S. Appl. No. 14/812,069, filed Jul. 29, 2015, 23 Pages.

"Patent Cooperation Treaty PCT International Search Report", International Application No. PCT/IB2021/057049, International Filing Date: Aug. 2, 2021, Date of Mailing: Oct. 27, 2021, 7 pages.

Japan Patent Office, "Notice of Reasons for Refusal," Nov. 5, 2024, 10 Pages, JP Application No. 2023-507273.

* cited by examiner

ALERT MANAGEMENT IN DATA PROCESSING SYSTEMS

BACKGROUND

The present invention relates generally to alert management in data processing systems, and more particularly to methods and systems for dynamically updating an alert management system which matches alerts with automated processes for handling the alerts.

Alerts are generated in data processing systems when some detectable condition or other event occurs that is significant for overall management of system operation. In processing systems such as computer networks, data centers, cloud computing systems, and other complex IT infrastructures, a great many such alerts may be generated. These alerts, which comprise descriptions of the events that have occurred, must be processed and handled appropriately to alleviate alert conditions and maintain reliable system operation. Alert management systems receive and process alerts, deciding which can be handled by automated processes ("automata") and which should be escalated to system engineers for response. The use of automata allows alert management systems to manage millions of alerts per day. Alerts can be matched with automata using predefined rules to decide, based on the alert description, which (if any) of the automated tools is appropriate for responding to the alert.

Automata often run with elevated privileges on potentially sensitive systems. The ruleset for deploying these tools must be constructed with care and is subject to constant manual review and maintenance. As processing systems evolve and the infrastructure changes, alerts can change accordingly. Accommodating such changes while ensuring effective and appropriate use of automata presents a significant challenge.

SUMMARY

One aspect of the present invention provides a computer-implemented method for dynamically updating an alert-management system that uses a master ruleset to match alerts in a data processing system with automated processes ("automata") for handling the alerts. The method includes training a machine learning model to correlate alerts with the automata using a training dataset comprising matched alerts that were successfully handled by the automata. The machine learning model is then applied to correlate unmatched alerts with automata, wherein the unmatched alerts were not matched to the automata by the master ruleset. The method further comprises analyzing operation of the machine learning model in relation to correlation of the unmatched alerts to define a new ruleset for matching the unmatched alerts with the automata. The method further comprises outputting the new ruleset for auditing of each rule in the new ruleset. In response to approval of an audited rule, the audited rule is added to the master ruleset.

Methods embodying the invention enable alert management systems to evolve and improve dynamically during operation of the system. The power of machine learning (ML) can be exploited to improve system operation, while overcoming the inherent conflict between inscrutability of ML models and the need for transparency and auditing of rules controlling deployment of automata. The ML model, trained on alerts successfully handled by matched automata, is not used simply to assign automata to alerts which were unmatched by the master ruleset. Instead, these alerts are applied to the model and the correlation operation for these specific alerts is analyzed to extract a new ruleset. The new ruleset, derived for unmatched alerts, can then be audited before rules are added to the master ruleset. This provides an elegant and powerful technique for systematic improvement of alert management systems. Systems can continually adapt to improve handling of alerts, extending their automated response capabilities and accommodating new alerts as processing systems evolve.

Methods embodying the invention can use a variety of ML models, even "black-box" type models, such as neural networks, which are not readily scrutable. In these embodiments, the step of analyzing operation of the model can use a model-independent explanation technique to identify one or more elements of each unmatched alert that are important for obtaining the correlation result for that alert. For example, ML models typically provide some type of confidence value, which estimates correlation accuracy, for a correlation result. Models may, for example, provide a set of probabilities indicating a likelihood that each possible correlation result, or classification, is correct for an input sample. With these models, the step of analyzing operation of the model may include, when applying the model to correlate each unmatched alert, calculating an initial confidence value, estimating correlation accuracy, for the initial correlation result. For different elements (e.g. particular fields or strings) of the alert, that element is then removed, and the model re-applied to the resulting alert to calculate a new confidence value for the initial correlation result. At least one element of the alert can be identified as an important element for the initial correlation result based on a difference between the initial and new confidence values for the different elements. Generation of the new ruleset can then be based on the important elements of the unmatched alerts. This provides a simple rule extraction technique with flexibility in choice of ML model, allowing even black-box models to be used where desired.

In preferred embodiments, the ML model comprises a tree-ensemble model. In these embodiments, the step of analyzing operation of the model may comprise generating a new tree, defining the new ruleset, based on features of paths through trees in the tree-ensemble via which unmatched alerts were correlated with automata. Analysis of the inference process for unmatched alerts can exploit the structure of tree-ensemble models for efficient generation of new rulesets. These embodiments can harness scrutability of the model to obtain more sophisticated rulesets than may be achievable with black-box models. The rulesets can be generated in various ways and are advantageously tailored based on confidence and/or coverage aspects detailed further below.

Another aspect of the invention provides a computer program product comprising a computer readable storage medium embodying program instructions, executable by a processing apparatus, to cause the processing apparatus to implement a method for dynamically updating an alert management system as described above.

An additional aspect of the invention provides an alert-management system comprising a communications interface for receiving alerts from a data processing system, memory storing automata for handling alerts and a master ruleset for matching alerts with the automata, and control logic configured to implement a method described above.

Embodiments of the invention will be described in more detail below, by way of illustrative and non-limiting example, with reference to the accompanying drawings.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments to be described may be performed as computer-implemented methods for dynamically updating alert management systems. The methods may be implemented by a computing system comprising one or more general or special-purpose computers, each of which may comprise one or more (real or virtual) machines, providing functionality for implementing the operations described herein. Steps of methods embodying the invention may be implemented by program instructions, e.g. program modules, implemented by a processing apparatus of the system. Generally, program modules may include routines, programs, objects, components, logic, data structures, and so on that perform particular tasks or implement particular abstract data types. The computing system may be implemented in a distributed computing environment, such as a cloud computing environment, where tasks are performed by remote processing devices that are linked through a communications network. In a distributed computing environment, program modules may be located in both local and remote computer system storage media including memory storage devices.

Figure 1:
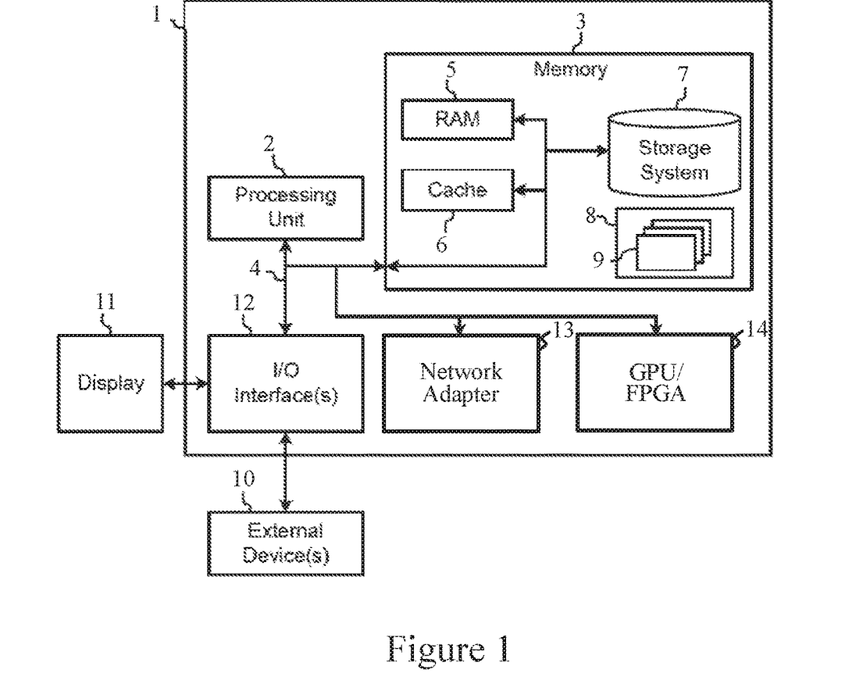
FIG. 1 is a block diagram of an exemplary computing device for implementing methods of an alert management system, in accordance with an embodiment of the present invention.

FIG. 1 is a block diagram of an exemplary computing device for implementing methods of an alert management system, in accordance with embodiments of the present invention. The computing device is shown in the form of a general-purpose computer 1. The components of computer 1 may include a processing apparatus, such as one or more processors represented by processing unit 2, a system memory 3, and a bus 4 that couples various system components including system memory 3 to processing unit 2.

Bus 4 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 1 typically includes a variety of computer readable media. Such media may be any available media that is accessible by computer 1 including volatile and non-volatile media, and removable and non-removable media. For example, system memory 3 can include computer readable media in the form of volatile memory, such as random-access memory (RAM) 5 and/or cache memory 6. Computer 1 may further include other removable/non-removable, volatile/non-volatile computer system storage media. By way of example only, storage system 7 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 4 by one or more data media interfaces.

Memory 3 may include at least one program product having one or more program modules that are configured to carry out functions of embodiments of the invention. By way of example, program/utility 8, having a set (at least one) of program modules 9, may be stored in memory 3, as well as an operating system, one or more application programs, other program modules, and program data. Each of the operating system, one or more application programs, other program modules, and program data, or some combination thereof, may include an implementation of a networking environment. Program modules 9 generally carry out the functions and/or methodologies of embodiments of the invention as described herein.

Computer 1 may also communicate with: one or more external devices 10 such as a keyboard, a pointing device, a display 11, etc.; one or more devices that enable a user to interact with computer 1; and/or any devices (e.g., network card, modem, etc.) that enable computer 1 to communicate with one or more other computing devices. Such communication can occur via Input/Output (I/O) interfaces 12. Also, computer 1 can communicate with one or more networks such as a local area network (LAN), a general wide area network (WAN), and/or a public network (e.g., the Internet) via network adapter 13. As depicted, network adapter 13 communicates with the other components of computer 1 via bus 4. Computer 1 may also communicate with additional processing apparatus 14, such as a GPU (graphics processing unit) or FPGA, for implementing embodiments of the invention. It should be understood that although not shown, other hardware and/or software components could be used in conjunction with computer 1. Examples include, but are not limited to microcode, device drivers, redundant processing units, external disk drive arrays, RAID systems, tape drives, data archival storage systems, etc.

Figure 2:
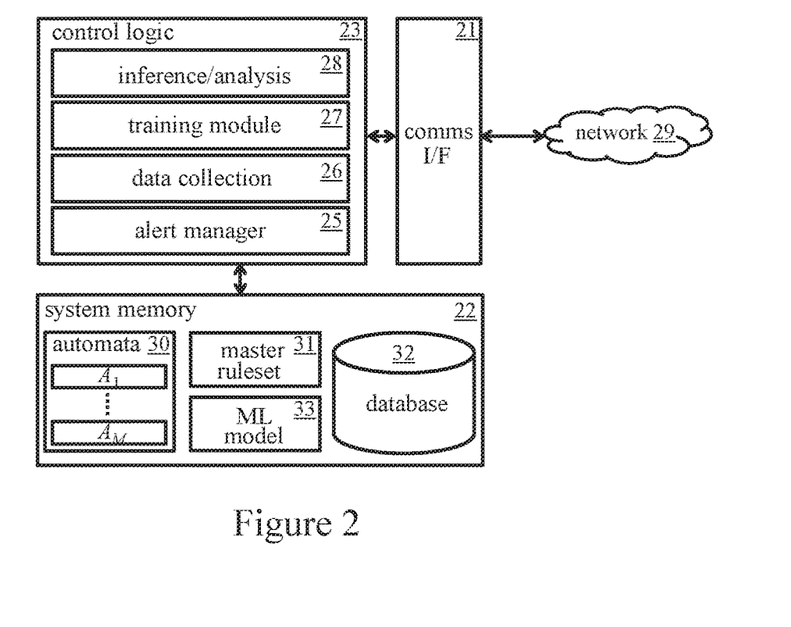
FIG. 2 illustrates component modules of an alert management system, in accordance with an embodiment of the present invention.

FIG. 2 illustrates component modules of an alert management system 20, in accordance with an embodiment of the present invention. Alert management system 20 comprises communications interface 21, memory 22, and control logic 23, which controls system operation. Control logic 23 comprises alert manager module 25, data collection module 26, training module 27, and inference & analysis module 28.

In operation, alert management system 20 receives alerts generated in a data processing system, represented here by network 29, via communications interface 21. Alert manager 25 receives and processes these alerts, deciding which can be handled by automated response processes and which should be escalated to system engineers. In particular, memory 22 stores a set of automated processes ("automata") 30 for implementing automated response processes. The automata 30 comprise software tools Ai, in which i=1 to M, which can be deployed by alert manager 25 to implement processes for handling various alert events in network 29. Such automata can handle numerous system tasks, e.g., to archive logs in response to capacity-usage alerts, to identify and remove so-called "zombie" processes that provide no useful output, and so on. Memory 22 also stores master ruleset 31 that defines the rules for matching alerts with the appropriate automata. Master ruleset 31 provides a set of closed-form rules for deterministic matching of alerts with automata. Such rules may use regular expressions for mapping alerts to automata based on elements of the alert description, e.g., content of particular fields or strings in the alert format. Alert manager 25 uses master ruleset 31 to decide if a received alert matches an automaton Ai. If not, the alert is communicated to system engineers, e.g., via an operator Graphical User Interface (GUI) provided at one or more user computers, which may be local or remote from system 20. If a matching automaton is identified, the alert manager deploys the automaton to handle the alert and monitors completion of the task. If the alert condition is successfully resolved, the alert can be signed off. If further action is required, system engineers can be notified accordingly.

Data collection module 26 monitors overall performance of the alert handling system by storing details of all alerts, responses, and outcomes in system memory 22. This alert history is represented as database 32 in FIG. 2. This database thus accumulates details of all alerts which were successfully handled by automata in the system, alerts which were handled by automata but not successfully resolved, and details of any "unmatched alerts", i.e., alerts which were not matched to automata by the master ruleset and so had to be escalated for human response.

Training module 27 and inference/analysis module 28 of control logic 23 provide functionality for implementing a dynamic update process for alert management system 20. This process involves training and analysis of ML model 33 whose parameters are stored in system memory 22. The dynamic update process is described in detail below.

Functionality of control logic modules 25 through 28 may be implemented, in general, by software (e.g., program modules) or hardware or a combination thereof. In other embodiments, functionality may be allocated differently between modules of the system, and functionality of one or more modules may be combined. In general, the component modules of alert management system 20 may be provided in one or more computers of a computing system. For example, all modules may be provided in computer 1 of FIG. 1, which may be integrated in alert management system 20, or modules may be distributed over a plurality of computers/servers which may be local or remote from alert management system 20. System memory 22 may be implemented by one or memory/storage components associated with one or more computers of alert management system 20.

Figure 3:
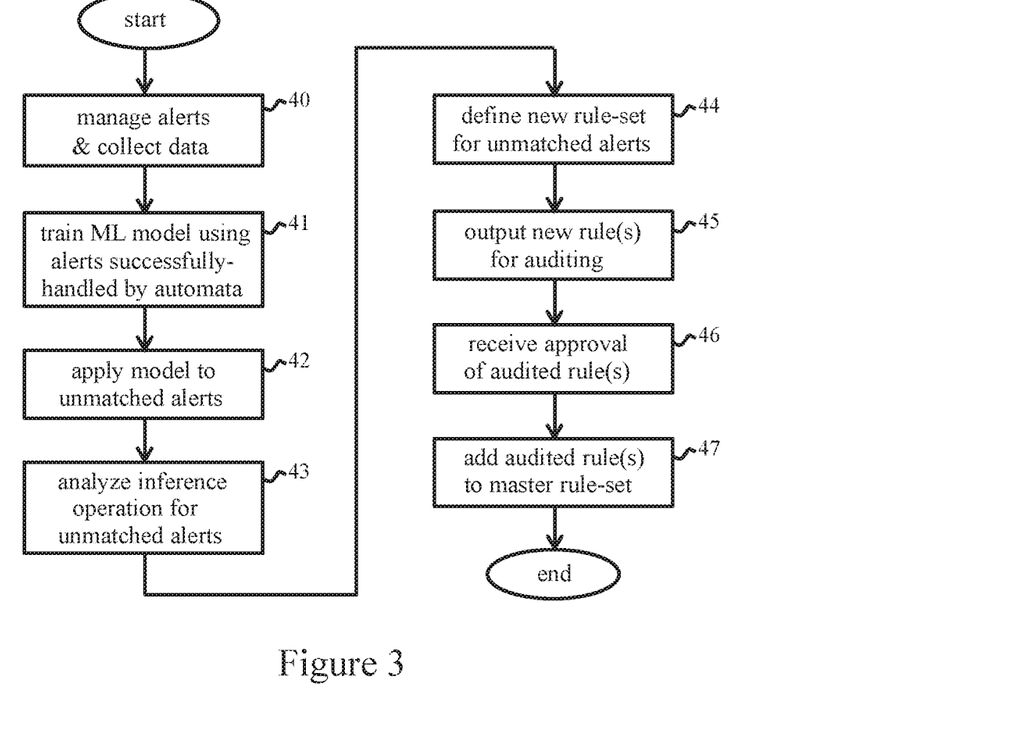
FIG. 3 depicts a flowchart of steps of the alert management system of FIG. 2, in accordance with an embodiment of the present invention.

FIG. 3 depicts a flowchart of steps of the alert management system of FIG. 2, in accordance with an embodiment of the present invention. Step 40 represents the alert management and data collection operations, described above, performed by alert manager module 25 and data collection module 26 during system operation. Details of all alerts (including, inter alia, unmatched alerts and alerts successfully handled by automata) are stored in database 32 as described above. The successfully handled alerts form a training dataset that can be used for training ML model 33. In particular, in step 41, training module 27 uses these "successful" alerts to train ML model 33 to correlate alerts with automata via a supervised learning process. Such processes are well-known and use known classifications for training samples, here automata Ai matched to successful alerts, as labels for the learning process via which model parameters are progressively adapted until the model can correlate alerts with automata to a desired degree of accuracy.

After training of model 33, in step 42, inference & analysis module 28 applies the model to correlate unmatched alerts in database 32 with automata. The correlation results for these inference operations are stored in database 32. In step 43, inference & analysis module 28 analyzes operation of the model in relation to correlation of the unmatched alerts. This process examines the inference process in the model specifically for the unmatched alerts as is explained in more detail below. Based on this analysis, in step 44, inference & analysis module 28 defines a new ruleset for matching the unmatched alerts with automata. The new ruleset (which may comprise one or more rules) is output in step 45, e.g., by displaying the new rule(s) in a GUI, for auditing by system engineers. In response to approval of an audited rule, indicated at step 46, inference & analysis module 28 adds the audited rule to the master ruleset 31 in system memory 22 in step 47.

The above process allows alert management system 20 to improve progressively in operation, dynamically updating its automated response capabilities to reduce escalation of unmatched alerts and to handle alerts with new/modified alert descriptions, which inevitably arise during evolution of monitored systems. The alert management system harnesses the power of machine learning while accommodating the need for transparency and auditing of rules for deploying automata. New rules generated by analysis of inference operations for unmatched alerts can be reviewed and approved to ensure that deployed automata are appropriate to alert events and satisfy contractual terms of any associated customer agreements. The dynamic update process thus enables systematic improvement of alert management systems by improving quality and reducing cost of system maintenance while ensuring all updates can be authorized with due diligence.

Training of the model in step 41 of FIG. 3 may be performed when sufficient successful alerts are available or may be performed periodically as successful alerts accumulate. Training may thus continue during system operation to improve model performance Inference for unmatched alerts may also be performed periodically, e.g., for batches of unmatched alerts, or may be performed as individual unmatched alerts are received to record classification results. The analysis process of step 43 may be performed when deemed appropriate for a given system, e.g., when a predetermined number of unmatched alerts, or unmatched alerts of a given type or with a given classification result in inference step 42, have accumulated. Analysis may also be initiated under operator control based on monitoring of the alert history in database 32. Approval of an audited rule in step 46 can be indicated by operator input, either approving a rule as is or approving a modified form of the rule defined via the auditing process, e.g., by modifying the rule in a GUI. Rules may, for instance, be modified to broaden their application, e.g., to cover all forms/endings of a particular keyword used in a rule, at operator discretion.

As a simple illustration of the above process, training data may include numerous alerts with summaries such as "Disk utilization exceeded 95%" or "Storage space utilization exceeded 90%" that were resolved using an automaton "Disk Compactor". New system sensors may generate similar messages that do not quite match any existing rule, e.g., with summaries such as "Disk utilization exceeds 92%". Inference identifies "Disk Compactor" as a likely classification for those alerts, and analysis suggests that any alerts with summaries including the words "disk", "utilization", and "exceeds" should be matched with "Disk Compactor". The new rule may be manually modified during auditing to allow either "exceeds" or "exceeded" before adding to the master ruleset.

Examples of the inference analysis process in inference & analysis module 28 are described in more detail below. In preferred embodiments, ML model 33 comprises a tree-ensemble model such as a boosted random forests (RF) model. Tree-ensemble models comprise multiple decision trees that are generated during training to map training samples to appropriate correlation results, herein to map alerts to automata. The trees are generated by repeatedly splitting samples in the training dataset into subsets based on whether randomly selected elements of the samples satisfy selected conditions. Each resulting tree comprises a hierarchy of nodes and branches as shown in the simple schematic of FIG. 4. Each node represents a decision as to whether a specified element of an input sample satisfies a specified condition, with branches from that node indicating the decision result, here "yes" or "no" (Y or N) according to whether the condition is or is not satisfied. In the present embodiment, input samples are alerts and the elements to which conditions are applied represent particular fields of the alert format. For example, alerts may comprise a series of name:value pairs, e.g., in JavaScript Object Notation (JSON) format, with pairs named "header", "summary", "description", "priority", etc. each having a text field defining the corresponding "value". A condition may test for appearance of a specified string in the text field of a specified element. Model training may use all or a selected subset (such as the header, summary, and description fields) of the alert format as the model input for a training sample, with corresponding elements of unmatched alerts then being used in the inference process. The inference process for a sample starts at the first (root) node of the tree and applies the associated condition to the test sample, following the resulting branch to the next node where the next condition is applied, and so on. Inference for the sample thus defines a path though the tree from the root node to one of the end branches (leaves). Each leaf is associated with a particular correlation result, here a classification corresponding to one of the automata $A_1$ to $A_M$.

Figure 4:
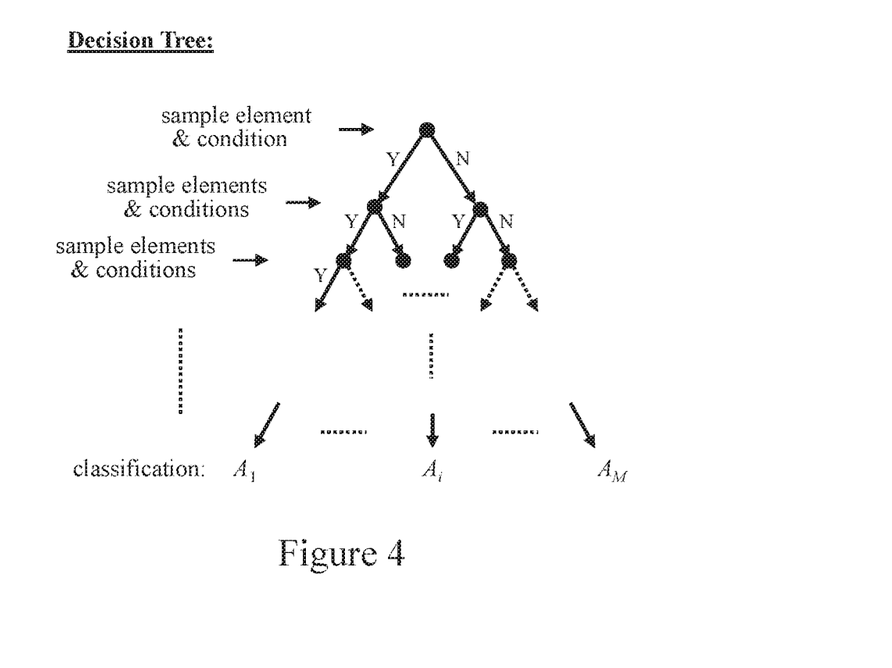
FIG. 4 illustrates structure of a decision tree in a tree-ensemble model used in the alert management system, in accordance with an embodiment of the present invention.

While FIG. 4 shows a simple example of a decision tree, tree-ensemble models comprise large numbers of decision trees, with various complex algorithms used to determine split elements, conditions, and other model parameters. The inference output of such a model typically comprises some average (e.g., the mode) of the classification results from all trees with an associated confidence value. The model may, for example, output a set of probabilities, one for each possible classification, with the highest probability classification indicating the overall correlation result.

In the preferred embodiments using tree-ensemble models, the inference analysis operation performed by inference & analysis module 28 comprises generating a new tree, i.e., defining the new ruleset for unmatched alerts, based on features of paths through trees in the tree-ensemble via which unmatched alerts were correlated with automata. Features here may comprise particular branches, with their associated conditions, and/or sections of paths comprising more than one branch/condition in the inference paths via which an unmatched alert was classified in trees of the ensemble. Because different trees will use different sample elements/conditions in different orders in the tree structure, preferred embodiments use pruning to reduce the number of tree features considered in the rule extraction process. Pruning can be based on confidence values associated with paths/branches in the trees and/or on coverage, i.e., numbers of unmatched alerts that were correlated with automata via those paths/branches. A new tree, defining the new ruleset for the unmatched alerts, can then be generated using some or all of the remaining, unpruned paths/branches.

Figure 5:
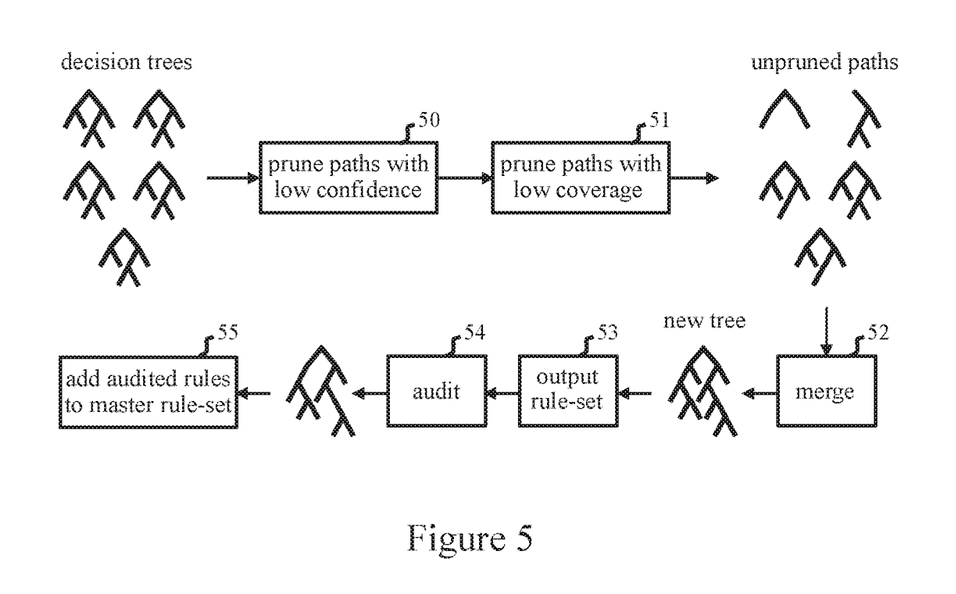
FIG. 5 illustrates operation of an analysis process, in accordance with an embodiment of the present invention.

Preferred embodiments perform aggressive pruning based on both confidence and coverage to reduce the number of tree features to a practical level for rule extraction. FIG. 5 illustrates operation of inference & analysis module 28 in an embodiment using a synthesis process to generate the tree for the new ruleset. In step 50, inference paths in the decision trees of the model are first pruned in dependence on a confidence value, indicating correlation accuracy, calculated for each path. Confidence values here may correspond to probabilities output by the model for particular classification results as described above. These values may in turn be calculated by combining (e.g. summing) confidence values associated with individual branches of inference paths in the trees. Various techniques can be employed for pruning based on confidence values. By way of example, paths with less than a defined threshold confidence may be pruned out, or all but a defined number of the highest-confidence paths, overall or per class, may be pruned. In general, one or a combination of confidence-evaluation criteria may be employed, with the overall objective of keeping only high-confidence paths.

In step 51, the resulting paths are further pruned in dependence on the numbers of unmatched alerts correlated with automata via respective paths, here with the objective of retaining paths with greater coverage (i.e., applying to higher numbers of unmatched alerts). Again, one or a combination of various criteria may be applied here, e.g., retaining only paths with above a threshold coverage, retaining a defined number of the highest coverage paths, etc. The overall effect of this pruning process is to discard paths least likely to be of significant value for classification of unmatched alerts.

In step 52, the remaining, unpruned paths are merged to generate a new tree from these paths. This process analyzes the elements/conditions associated with nodes/branches of the paths and creates a new tree accommodating those elements/conditions. This may involve appropriate ordering of nodes and/or modification (e.g., merging) of conditions to ensure that the new tree broadly encompasses the decision process defined by all unpruned paths. In step 53, inference & analysis module 28 outputs the ruleset defined by the new tree. A decision tree is logically equivalent to a list of rules and either can be constructed from the other. The review/audit phase (step 54) may be distributed here by assigning each path in the tree to a subject-matter expert in the remediation class assigned. On approval of each audited rule, the new rule is added to the master ruleset in step 55.

Figure 6:
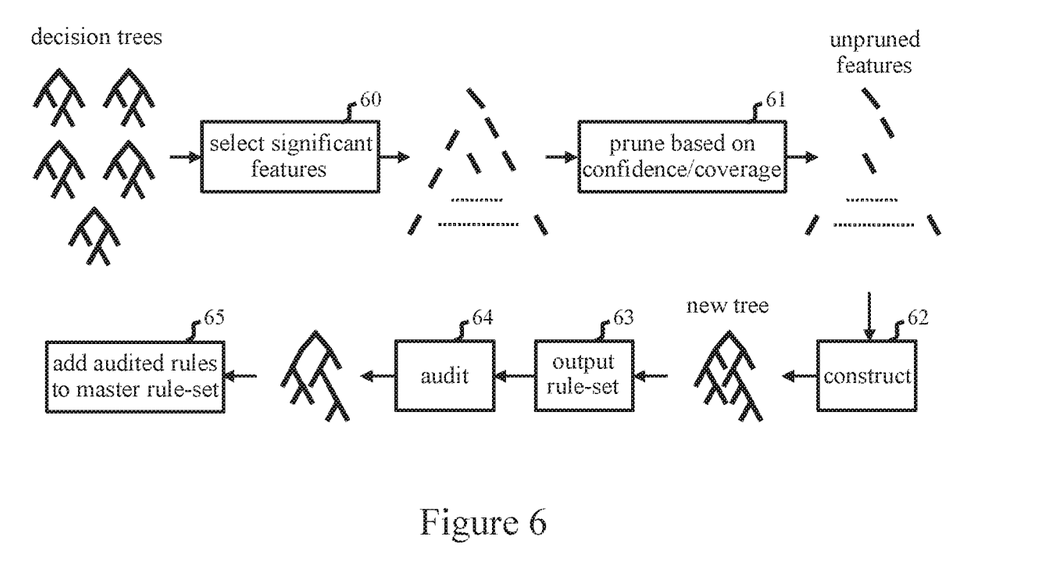
FIG. 6 illustrates operation of an alternative analysis process, in accordance with an embodiment of the present invention.

FIG. 6 illustrates the analysis operation in an embodiment using a decomposition process to generate the tree for the new ruleset. In step 60, inference & analysis module 28 first selects features from decision trees of the model based on significance values associated with respective features. The significance values here are associated with features of the trained model and indicate importance of the associated feature for correlating alerts in the original training dataset with one of the automata. It is common practice, when assessing quality of any model, to perform an analysis process to extract those features of the model that are most significant for each possible classification result. The results of such analysis can be used here to obtain the most significant model features associated with the classification results obtained for unmatched alerts. For the tree model of the present embodiments, significance values may be confidence values that are typically associated with individual branches of trees for each classification result.

After selecting the most-significant features, in step 61, these features are pruned according to their importance in the inference process for unmatched alerts. In particular, features can be pruned based on one, and preferably both, of confidence and coverage considerations. This process is similar to steps 51 and 52 of FIG. 5 but applied to significant features, here branches, as opposed to paths. The selected significant features may first be pruned based on the numbers of unmatched alerts that were correlated with automata via paths including each feature, retaining those features with higher coverage. This process could prune out all features that did not appear in any inference path, those that appeared in less than threshold number of paths, or the least-used features as a defined percentage, etc. The remaining features can be further pruned based on the confidence values calculated for the inference paths for unmatched alerts, e.g., retaining only those features appearing in high-confidence inference paths, which may be identified in various ways as described above.

In step 62, a new tree is generated from the remaining unpruned features. This process again analyzes the elements/conditions associated with the remaining branches and creates a new tree accommodating those elements/conditions, generally as described above in the FIG. 5 process. Subsequent steps 63, 64, and 65 correspond to steps 53, 54, and 55 of FIG. 5, respectively.

The analysis process of FIGS. 5 and 6 can exploit the structure of tree-ensemble models to extract features of particular importance for classification of unmatched alerts, constructing a new ruleset for these alerts accordingly. This is a powerful rule-extraction technique, exploiting insight into model operation for generation of finely tuned rule sets. However, methods embodying the invention may use other types of ML models, such as neural networks (including deep neural networks), Support Vector Machines (SVMs), etc.

Figure 7:
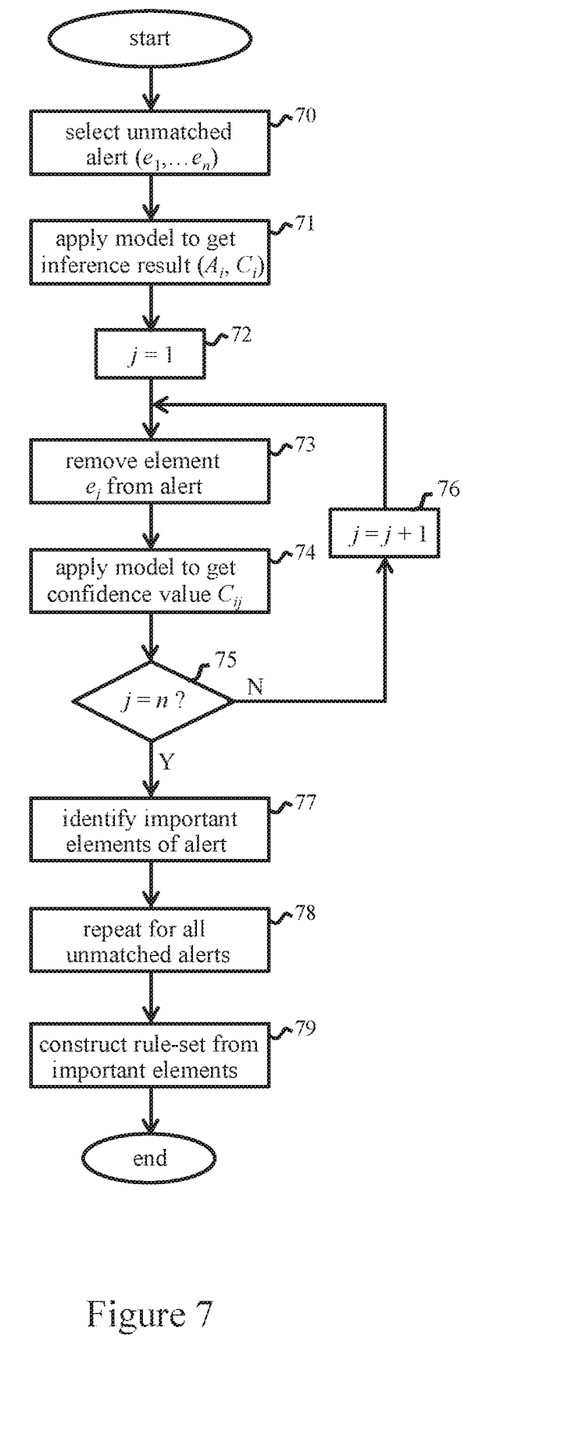
FIG. 7 indicates steps of an analysis process using a black-box model, in accordance with an embodiment of the present invention.

FIG. 7 indicates steps of an analysis process performed by inference & analysis module 28 in a system employing a general, black-box ML model 33. The analysis process here builds on a Local Interpretable Model Agnostic Explanations (LIME) type of technique for explaining model predictions. In step 70, an unmatched alert comprising elements $e_j$, where j=1 to n, (e.g., the values of name:value pairs) is selected for inference. In step 71, the ML model is applied to correlate the alert with an automaton, providing the elements $e_1$ to $e_n$ as the model inputs. An initial correlation result with associated confidence value $C_i$, is thus calculated and stored for the alert. A loop counter j is initialized in step 72. In step 73, the element $e_j$ is removed from the alert (e.g., replaced by a null or random string), and the model is reapplied to the resulting alert in step 74 to obtain a new confidence value $C_{ij}$ for the initial correlation result $A_i$. If j<n in decision step 75, the loop counter is incremented in step 76 and steps 73 and 74 are repeated for the next element of the alert. The inference process thus iterates, removing different elements $e_j$ of the alert and obtaining new confidence values $C_{ij}$ for the correlation result $A_i$.

In step 77, inference & analysis module 28 identifies at least one element of the alert as an important element for the initial correlation $A_i$ based on difference between the initial confidence value $C_i$ and the new confidence values $C_{i1}$ to $C_{in}$ for the different elements. Various criteria may be employed here to identify important elements, e.g., selecting elements that, when removed, decreased the confidence value by more than a threshold amount, or selecting one or more element(s) associated with the greatest drop in confidence, etc. The resulting set of important elements is then stored for the alert in question.

This above process is repeated for all unmatched alerts in the current batch as indicated at step 78. This process can be performed on a batch-by-batch basis where each batch comprises a group of unmatched alerts that the model assigns to the same class/automaton $A_i$. Batches may be further restricted to groups of alerts that the ML model classified with greater than a threshold confidence value. In step 79, inference & analysis module 28 then constructs a new ruleset based on the sets of important elements for the unmatched alerts. Rules are regenerated separately here for each classification result $A_i$. For example, for a given class $A_i$, rules may specify that alerts containing any of the identified sets of important elements for the unmatched alerts assigned to that class, or the common elements of these sets, should be matched with automaton $A_i$.

While FIG. 7 illustrates one example of an analysis process for black-box models, in general any model-independent explanation technique could be used to identify elements of an unmatched alert that are important for the correlation result obtained for the alert. The ruleset can then be constructed as before based on the important elements of the unmatched alerts.

It will be seen that embodiments for the invention offer improved alert management systems that can evolve dynamically to enhance their automated response capabilities while preserving security of audited, deterministic rulesets for automatic remediation procedures. It will of course be appreciated that numerous changes and modifications can be made to the exemplary embodiments described. For example, steps of flow diagrams may be implemented in a different order to that shown and some steps may be performed in parallel where appropriate. In general, where features are described herein with reference to a method embodying the invention, corresponding features may be provided in a system/computer program product embodying the invention, and vice versa.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for dynamically updating a master ruleset used by an alert management system that matches alerts in a data processing system with automated processes ("automata") for handling the alerts, the method comprising:

training, by one or more processors, a machine learning model to correlate the alerts with the automata using a training dataset comprising matched alerts successfully handled by the automata, wherein the automata includes archiving logs in response to capacity alerts and removing zombie processes, wherein the machine learning model comprises a tree-ensemble model;

applying, by the one or more processors, the machine learning model to correlate unmatched alerts with the automata, wherein the unmatched alerts were not matched to the automata by the master ruleset;

responsive to exceeding a number of unmatched alerts, analyzing, by the one or more processors, an operation of the machine learning model in relation to correlation of the unmatched alerts, further comprising:

generating, by the one or more processors, a new tree based on features of paths through trees in the tree-ensemble model via which the unmatched alerts were correlated with the automata, wherein the new tree defines the new ruleset; and pruning, by the one or more processors, the paths in dependance on a number on unmatched alerts correlated with automata via respective paths while retaining the paths with a higher number of unmatched alerts;

based on the analyzing, defining, by the one or more processors, a new ruleset for matching the unmatched alerts with the automata;

outputting, by the one or more processors, the new ruleset in a graphical user interface for auditing of each rule in the new ruleset;

responsive to approval of an audited rule of the new ruleset, adding, by the one or more processors, the audited rule to the master ruleset; and responsive to matching the automata, deploying, by one or more processors, the automata.

2. The computer-implemented method of claim 1, further comprising:

pruning, by the one or more processors, the paths based on a confidence value calculated for each path, wherein the confidence value is an estimation of a correlation accuracy; and generating, by the one or more processors, the new tree based on features of unpruned paths.

3. The computer-implemented method of claim 1, further comprising:

generating, by the one or more processors, the new tree based on features of unpruned paths.

4. The computer-implemented method of claim 1, further comprising:

pruning, by the one or more processors, the paths based on a confidence value calculated for each path and on a number of the unmatched alerts correlated with the automata via respective paths, wherein the confidence value is an estimation of a correlation accuracy; and generating, by the one or more processors, the new tree based on features of unpruned paths.

5. The computer-implemented method of claim 1, wherein the step of analyzing operation of the machine learning model further comprises:

selecting, by the one or more processors, features from the trees of the tree-ensemble model based on significance values, each significance value indicating importance of the associated feature for correlating alerts in the training dataset with one of the automata with which a respective unmatched alert was correlated; and generating, by the one or more processors, the new tree based on the selected features.

6. The computer-implemented method of claim 5, further comprising:

pruning, by the one or more processors, the selected features based on a number of the unmatched alerts correlated with the automata via the paths including each feature; and generating, by the one or more processors, the new tree based on unpruned features.

7. The computer-implemented method of claim 5, further comprising:

pruning, by the one or more processors, the selected features based on confidence values calculated for respective paths via which the unmatched alerts were correlated with the automata and which included a respective selected feature of the selected features, wherein the confidence value is an estimation of a correlation accuracy; and generating, by the one or more processors, the new tree based on unpruned features.

8. The computer-implemented method of claim 5, further comprising:

pruning, by the one or more processors, the selected features based on a number of the unmatched alerts correlated with the automata via the paths including each feature, and based on confidence values calculated for the respective paths, wherein the confidence value is an estimation of a correlation accuracy; and generating, by the one or more processors, the new tree based on unpruned features.

9. The computer-implemented method of claim 1, wherein the step of analyzing operation of the machine learning model further comprises:

responsive to applying the machine learning model to obtain a correlation result for an unmatched alert, using, by the one or more processors, a model-independent explanation technique to identify at least one element of the alert as an important element for the correlation result; and generating, by the one or more processors, the new ruleset based on the at least one element of the unmatched alerts.

10. The computer-implemented method of claim 1, wherein the step of analyzing operation of the machine learning model further comprises:

when applying the machine learning model to correlate each unmatched alert, calculating, by the one or more processors, an initial confidence value for the initial correlation result, wherein the initial confidence value is an estimation of a correlation accuracy;

for different elements of the alert, removing, by the one or more processors, that element and reapplying the machine learning model to the resulting alert to calculate a new confidence value for the initial correlation result;

identifying, by the one or more processors, at least one element of the alert as an important element for the initial correlation result based on a difference between the initial confidence value and the new confidence value for the different elements; and generating, by the one or more processors, the new ruleset based on the at least one element of the unmatched alerts.

11. The computer-implemented method of claim 1, wherein the machine learning model comprises a boosted random forests model.

12. A computer program product for dynamically updating a master ruleset used by an alert management system that matches alerts in a data processing system with automated processes ("automata") for handling the alerts, the computer program product comprising:

one or more computer readable storage media and program instructions stored on the one or more computer readable storage media, the program instructions comprising:

program instructions to train a machine learning model to correlate the alerts with the automata using a training dataset comprising matched alerts successfully handled by the automata, wherein the automata includes archiving logs in response to capacity alerts and removing zombie processes, wherein the machine learning model comprises a tree-ensemble model;

program instructions to apply the machine learning model to correlate unmatched alerts with the automata, wherein the unmatched alerts were not matched to the automata by the master ruleset;

program instructions to, responsive to exceeding a number of unmatched alerts, analyze an operation of the machine learning model in relation to correlation of the unmatched alerts, wherein the program instructions further comprise:

program instructions to generate a new tree based on features of paths through trees in the tree-ensemble model via which the unmatched alerts were correlated with the automata, wherein the new tree defines the new ruleset; and program instructions to prune the paths in dependance on a number on unmatched alerts correlated with automata via respective paths while retaining the paths with a higher number of unmatched alerts;

based on the program instructions to analyze, program instructions to define a new ruleset for matching the unmatched alerts with the automata;

program instructions to output the new ruleset in a graphical user interface for auditing of each rule in the new ruleset;

responsive to approval of an audited rule of the new ruleset, program instructions to add the audited rule to the master ruleset; and responsive to matching the automata, program instructions to deploy the automata.

13. The computer program product of claim 12, further comprising:

program instructions to prune the paths based on a confidence value calculated for each path, wherein the confidence value is an estimation of a correlation accuracy; and program instructions to generate the new tree based on features of unpruned paths.

14. The computer program product of claim 12, further comprising:

program instructions to generate the new tree based on the selected features.

15. The computer program product of claim 14, further comprising:

program instructions to prune the selected features based on a number of the unmatched alerts correlated with the automata via the paths including each feature and based on confidence values calculated for respective paths via which the unmatched alerts were correlated with the automata and which included a respective selected feature, wherein the confidence value is an estimation of a correlation accuracy; and program instructions to generate the new tree based on unpruned features.

16. The computer program product of claim 12, wherein the program instructions to analyze operation of the machine learning model further comprise:

responsive to applying the machine learning model to obtain a correlation result for a respective unmatched alert, program instructions to use a model-independent explanation technique to identify at least one element of the unmatched alert as an important element for the correlation result; and program instructions to generate the new ruleset based on the at least one element of the unmatched alerts.

17. The computer program product of claim 12, wherein the program instructions to analyze operation of the machine learning model further comprise:

when applying the machine learning model to correlate each unmatched alert, program instructions to calculate an initial confidence value for the initial correlation result, wherein the initial confidence value is an estimation of a correlation accuracy;

for different elements of the alert, program instructions to remove that element and reapply the machine learning model to the resulting alert to calculate a new confidence value for the initial correlation result;

program instructions to identify at least one element of the alert as an important element for the initial correlation result based on a difference between the initial confidence value and the new confidence value for the different elements; and program instructions to generate the new ruleset based on the at least one element of the unmatched alerts.

18. An alert-management system for dynamically updating a master ruleset used by an alert management system that matches alerts in a data processing system with automated processes ("automata") for handling the alerts, the alert-management system comprising:

one or more computer processors;

one or more computer readable storage media;

program instructions collectively stored on the one or more computer readable storage media for execution by at least one of the one or more computer processors, the stored program instructions comprising:

program instructions to train a machine learning model to correlate the alerts with the automata using a training dataset comprising matched alerts successfully handled by the automata, wherein the automata includes archiving logs in response to capacity alerts and removing zombie processes, wherein the machine learning model comprises a tree-ensemble model;

program instructions to apply the machine learning model to correlate unmatched alerts with automata, wherein unmatched alerts were not matched to the automata by the master ruleset;

program instructions to, responsive to exceeding a number of unmatched alerts, analyze an operation of the machine learning model in relation to correlation of the unmatched alerts, wherein the program instructions further comprise:

program instructions to generate a new tree based on features of paths through trees in the tree-ensemble model via which the unmatched alerts were correlated with the automata, wherein the new tree defines the new ruleset; and program instructions to prune the paths in dependance on a number on unmatched alerts correlated with automata via respective paths while retaining the paths with a higher number of unmatched alerts;

based on the program instructions to analyze, program instructions to define a new ruleset for matching the unmatched alerts with the automata;

program instructions to output the new ruleset in a graphical user interface for auditing of each rule in the new ruleset;
responsive to approval of an audited rule, program instructions to add the audited rule to the master ruleset; and
responsive to matching the automata, program instructions to deploy the automata.

\* \* \* \* \*